United States Patent
Cohn et al.

(10) Patent No.: US 10,171,206 B2
(45) Date of Patent: Jan. 1, 2019

(54) METHODS AND APPARATUSES FOR REFRAMING AND RETRANSMISSION OF DATAGRAM SEGMENTS

(71) Applicant: Lantiq Israel Ltd., Ra'anana (IL)

(72) Inventors: Daniel Cohn, Ra'anana (IL); Yaron Alpert, Hod Hasharon (IL)

(73) Assignee: Lantiq Israel Ltd., Ra'Anana (IL)

( * ) Notice: Subject to any disclaimer, the term of this patent is extended or adjusted under 35 U.S.C. 154(b) by 252 days.

(21) Appl. No.: 14/653,863

(22) PCT Filed: Dec. 20, 2013

(86) PCT No.: PCT/IB2013/061202
§ 371 (c)(1),
(2) Date: Jun. 19, 2015

(87) PCT Pub. No.: WO2014/097252
PCT Pub. Date: Jun. 26, 2014

(65) Prior Publication Data
US 2015/0349927 A1    Dec. 3, 2015

Related U.S. Application Data

(60) Provisional application No. 61/739,771, filed on Dec. 20, 2012.

(51) Int. Cl.
*H04L 1/00* (2006.01)
*H04L 1/08* (2006.01)
(Continued)

(52) U.S. Cl.
CPC .............. *H04L 1/08* (2013.01); *H04L 1/009* (2013.01); *H04L 1/0083* (2013.01);
(Continued)

(58) Field of Classification Search
CPC ... H04L 1/0007; H04L 1/1874; H04L 1/1896; H04L 5/0055; H04L 1/08; H04L 69/166;
(Continued)

(56) References Cited

U.S. PATENT DOCUMENTS 7,817,669 B2 * 10/2010 Pani ..................... H04L 1/0007
370/465
7,907,613 B1    3/2011 Chiabaut
2012/0314636 A1 12/2012 Liu

FOREIGN PATENT DOCUMENTS

JP    03-040557         2/1991
WO      03043259 A1     5/2003
(Continued)

OTHER PUBLICATIONS

Office Action dated May 31, 2016 issued for parallel JP application 2015-548870.
International Search Report of PCT/IB2013/061202.

*Primary Examiner* — James C Kerveros
(74) *Attorney, Agent, or Firm* — Eschweiler & Potashnik, LLC

(57) ABSTRACT

A source device for sending datagrams contained in an aggregated packet structure comprising transport containers each containing one or more datagram segments of the datagram, the source device comprising a feedback processor configured to receive feedback that a transmission of a transport container has failed or a detector unit that detects that a transmission of a transport container will fail; a disassembler unit that disassembles the failed transport container the transmission of which has failed or will fail; a creating unit that creates at least one new transport container from less than all of the failed transport containers without splitting datagrams; and a sending unit that sends sequence information indicating a conversion between a sequence of the transport containers of the failed datagram and a
(Continued)

sequence of the transport containers of the new datagram, where the source device is configured to reformat and retransmit datagrams whose transmission has failed.

10 Claims, 4 Drawing Sheets

(51) Int. Cl.
*H04L 1/18* (2006.01)
*H04L 29/06* (2006.01)
(52) U.S. Cl.
CPC .......... *H04L 1/0084* (2013.01); *H04L 1/1867* (2013.01); *H04L 1/1896* (2013.01); *H04L 69/166* (2013.01)
(58) Field of Classification Search
CPC ..... H04L 1/0084; H04L 1/009; H04L 1/1867; H04L 1/0083
USPC ................................................. 714/776, 748
See application file for complete search history.

(56) References Cited

FOREIGN PATENT DOCUMENTS

| WO | 2006043746 A1 | 4/2006 |
| WO | 2008094662 A2 | 8/2008 |
| WO | 2012170864 A2 | 12/2012 |

* cited by examiner

METHODS AND APPARATUSES FOR REFRAMING AND RETRANSMISSION OF DATAGRAM SEGMENTS

CROSS-REFERENCE TO RELATED APPLICATION

This application is a national stage entry of PCT/IB2013/061202 having an international application date of Dec. 20, 2013, which application claims priority of U.S. Application Ser. No. 61/739,771, filed Dec. 20, 2012, entitled, "Methods and Apparatuses for Reframing and Retransmission of Datagram Segments". The entire disclosure of the prior application is considered part of the disclosure of this application and is hereby incorporated by reference.

BACKGROUND

In current communication systems, datagrams are transferred from a source to a destination according to a known procedure or protocol, typically as part of the so-called Open Systems Interconnection Model (OSI model). In accordance with the OSI model, higher level communication datagram segments (which are often called "Service Data Units" or SDUs) are packed in transport containers (which are often called "Protocol Data Units" or PDUs), transported by lower layers via a physical medium. In some systems, particularly but not exclusively systems defined by IEEE standards, a Media Access Control (MAC) sub-layer SDU is called a "MAC Service Data Unit" ("MSDU") and a MAC sub-layer PDU is called a MAC Protocol Data Unit ("MPDU"). 802.11 WLANs are one such example of systems defined by an IEEE standard.

In some systems, each container is assigned a unique sequence number ("SN"), which is typically set by the chronological order in which the containers are delivered from a higher layer to a lower layer. The PDU in such systems has a sequence number field for holding a sequence number. In current communication systems, the sequence position of a transport container and its sequence numbers cannot be changed after the containers first transmission. When a container has been transmitted by a source but not correctly received by a destination, the result is called a "transmission failure" or simply "container failure". According to current technology, when a container has failed, the source will retransmit the container with the same sequence number, and the destination will use the SNs of all the containers to recreate the correct order of the containers intended by the source, regardless of the fact that the destination might not receive the containers in their correct sequential order. In some systems, the PDU has a sequence number field for holding a sequence number.

In some systems, there is a defined a "maximum transmission unit" ("MTU") of a container, typically the largest size of container that may be transmitted, possibly measured in number of bytes. In other systems, there is a maximum transmission time which, at maximum transmission rate, translates to a maximum transmission unit MTU for such systems. Transmitters typically try to avoid exceeding the MTU limit by encapsulating SDUs in PDUs that meet the MTU limitation, possibly by fragmenting the datagram payload into two or more smaller pieces. However this is not always possible. Since the MTU sometimes depends on the selected TX format, and this is not always known to the higher layer if the container is larger than the MTU, the container transmission will fail, or the container will simply be dropped from a transmission of multiple containers. In either case, system performance degrades. The problem described herein occurs in all communication systems, and particularly in systems where operating conditions can change rapidly, thereby leading to sharp degradations of system performance and a decrease in the MTU value. That is typical, for example, in wireless systems, but not limited to wireless systems.

Various solutions have been implemented for this problem, none of which are entirely satisfactory. One solution is to allow the datagram payload to be fragmented or "partitioned" into two or more smaller pieces, each piece of which is then encapsulated in a new transport container that does not exceed the MTU limit. These multiple containers are then aggregated in a process called "frame aggregation". Although this approach will allow transmission of long datagram payloads, it also complicates the protocol, adds communication overhead, and it can be implemented only in systems in which (1) this solution has been written into the standard and (2) the source and destination employing the solution are both capable of implementing the solution. The second requirement is not trivial, since legacy units may not be configured to implement this approach.

A second solution which has been implemented is to retransmit failed containers at a lower rate in order to improve the likelihood of successful transmission. This solution is limited in that standards generally define maximum transmission times which might not be sufficient to transmit the containers the lower data rate. In addition, environmental conditions may make even the lower rate insufficient. In addition, the stream of container transmission may be such that the lower rate is simply insufficient to transmit all the required information at a given packet error rate (PER) level limits.

A third solution that has been implemented is to wait until transmission conditions have improved, then to retransmit the failed containers at the standard transmission rate, thereby avoiding the problems associated with transmission at a lower rate. This solution increases latency for failed containers, increases latency also for subsequent containers that require prior transmission of the failed containers, and makes the entire system dependent on environmental conditions which are both highly variable and uncontrollable. Since packet viability is often limited by a Time to Life, "TTL", increased latency may lead to expiration of packets prior to delivery, which increases the PER.

A fourth solution that has been implemented is to ignore the protocol rules about MTU, and to allow transmissions longer than the MTU limits. This may work temporarily in systems in which there is a relative paucity of sources and receivers, but as the system loads up with additional units, transmissions longer than the permitted maximum may ultimately lead to system chaos A fifth solution is to avoid the problem entirely by not allowing long messages, or by placing limits on the degree of aggregation that may be implemented. This solution reduces the nature of data that may be transmitted, or adds communication overhead, or both.

All of the solutions above suffer from one or more of the following disadvantages:
1. Significant, potentially drastic, increase in the packet error rate.
2. Complicating a communication protocol.
3. Adding significant communication overhead, thereby reducing system efficiency.
4. Ignoring the fact that some units, possibly legacy units, cannot function with the proposed solution.

5. Overruling protocol rules, which can cause interoperability problems with legacy units, and which can lead to chaos as a system approaches system capacity.
6. Latency increases.
7. Dropping all failed aggregated packets at a container, which makes the system entirely depending on the variability of a changing environment, and which cannot make any distinction between the kinds of information or size of information packets in failed transmissions.

The description above, including system requirements and performance, problems, and possible solutions, applies also, with required changes, to all networks, including wide area networks such as W-CDMA, LTE and local area networks such as WLAN, in which the sequence numbers, "SNs", cannot be changed after a packet has been transmitted for the first time. As for 802.11 WLAN in particular:

1. In some technologies, such as 802.11 WLAN, PDUs have a sequence number field that holds a sequence number for indicating sequential ordering of PDUs in a stream.
2. In some IEEE standards, such as 802.11 WLAN, frame aggregation is used to increase throughput by encapsulating multiple higher-layer frames in a single lower-layer frame. In 802.11 WLAN in particular, a physical-layer protocol data unit (PPDU) includes a significant amount of overhead, including, for example, PPDU headers. At the highest data rates, this overhead can consume more bandwidth than the data frame payload.
3. The IEEE 802.11 WLAN standard defines two levels of MAC packets aggregation. These are (a) aggregation of MAC service data units (MSDUs) at the top of the MAC layer, sometimes called "MSDU aggregation" or simply "A-MSDU", and (b) aggregation of MAC protocol data units (MPDUs) at the bottom of the MAC layer, sometimes called "MPDU aggregation" or simply "A-MPDU". Both types of aggregation group multiple data frames into one large frame. It is possible also to combine the two aggregations (a) and (b) by aggregating MSDUs into A-MSDUs, and then encapsulating these A-MSDUs in MPDUs that are in turn aggregated in aggregate MPDUs (A-MPDUs).
4. As explained above, each of the transport containers is assigned at the first transmission with a unique sequence number (SN), and this sequence is generally the chronological order in which the containers are transmitted by a source at the higher layer of the OSI model. In the IEEE 802.11 WLAN, this sequence cannot be changed after first transmission. When MPDUs are not correctly received in 802.11 WLAN, the transmitter will retransmit them and the receiver will use the SNs to deliver the encapsulated MSDUs in the order they were transmitted (even though they may be received out of order over the air due to retransmissions).
5. When A-MSDU aggregation is used, the IEEE 802.11 protocol does not support the fragmentation mechanism. The result is that the MPDUs having length that exceeds the MTUs will be dropped. This phenomenon occurs often at a wireless link where the link conditions between the transmitter and the receiver have deteriorated.
6. In the A-MSDU-encapsulated-in-A-MPDU scenario described above, the transmitter will typically retransmit failed MPDUs in a lower rate to improve the likelihood of correct reception. In this case, the MPDU transmission time will increase, possibly above the limit allow by the 802.11 WLAN standard, which is currently approximately 5.4 ms per PPDU. If the maximum transmission time will be exceeded, the MPDU must be dropped. In some scenarios, the dropping of MPDUs will increase significantly the packet error rate (PER) in some scenarios.
7. The six solutions for communication systems generally, as described above, may be implemented for 802.11 WLAN systems, but the same problems will occur in the 802.11 WLAN systems as for communication systems generally. Further, in 802.11 WLAN, it is impossible to encapsulate MSDUs or A-MSDUs that were part of failed transmissions into a different number of MPDUs before retransmission, in order to reduce the size of transmission and therefore the time duration of transmission for each of the failed MPDUs. This cannot be done because SNs were already assigned to the failed and subsequent MPDUs, so if formerly transmitted MSDUs or A-MSDUs were encapsulated and transmitted as parts of new MPDUs, the receiver would not be able to correctly identify the retransmitted MPDUs or place such retransmitted MPDUs in their correct order for subsequent delivery of the encapsulated MSDUs to further layers of the OSI protocol.

SUMMARY

In communication systems, changing conditions can cause an increase in the failure rate of transport container transmissions, to the point that the packet error rate becomes unacceptably high. These problems occur in all communication systems, particularly but not exclusively in systems operating within a maximum dynamic transmission unit environment, in wireless systems, particularly but not exclusively in WLAN systems defined according to the IEEE standard. Various solutions have been implemented, including, among others, reducing the rate of transmission or retransmitting failed containers. None of the solutions implemented thus far have been wholly satisfactory. There are proposed herein novel systems and methods for sequence control and synchronization between transmission sources and reception destinations, in order to split datagram segments among multiple containers and thereby decrease the packet error rate of the system.

In an aspect, a source device for sending datagrams contained in an aggregated packet structure comprising transport containers each containing datagram segments of the datagram, comprises: a feedback processor configured to receive feedback if a transmission of a transport container has failed; a disassembler unit configured to disassemble the transport container whose transmission failed; a creating unit configured to create a plurality of new transport containers, the new transport containers to include fragments of the datagram segment contained in the transport container whose transmission failed; and a sending unit configured to send sequence information indicating a conversion between a sequence of the transport containers of the aggregated packet structure comprising the transport container whose transmission failed and a sequence of the transport containers of the aggregated packet structure comprising the new transport containers, thereby the source device being configured to reformat and retransmit datagrams whose transmission has failed without splitting datagrams.

In an embodiment, the source device is configured to assign representation of segment information represented by the datagram segment in a failed transport container to a plurality of further datagram segments in a plurality of new transport containers to collectively represent the segment information In an embodiment, assigning representation of segment information includes reformatting the datagram segment by disassembling the datagram segment to split the datagram segment into multiple new segments, and by placing such new segments into multiple new transport containers for later transmission.

In an embodiment, the source device is further configured to: notify a destination device that the reformatted datagram segments have been reformatted and are ready to be transmitted, receive notification from the destination device that the destination device can accept the reformatted datagram segments, and thereafter transmit the reformatted datagram segments to the destination device.

In an aspect, a source device for sending datagrams contained in an aggregated packet structure comprising transport containers each containing one or more datagram segments of the datagram, comprises: a detector unit that detects if a transport container cannot be transmitted; a disassembler unit configured to disassemble the transport container that cannot be transmitted; and a sending unit configured to send sequence information indicating a conversion between a sequence of the transport containers of the aggregated packet structure comprising the transport container that cannot be transmitted and a sequence of the containers of aggregated packet structure comprising the new transport containers, thereby the source device being configured to reformat and retransmit datagrams whose transmission has failed without splitting datagrams.

In an embodiment, assigning representation of segment information includes reformatting the transport container that cannot be transmitted by disassembling the datagram segment to split the datagram segment into multiple new datagram segments, and by placing such new datagram segments into multiple new transport containers for later transmission.

In an embodiment, the source device further is configured to notify a destination device that the reformatted datagram has been reformatted and is ready to be transmitted, receive notification from the destination device that the destination device can accept the reformatted datagram, and thereafter transmit the reformatted datagram to the destination device.

In an aspect, in a method for transmitting datagrams from a source device to a destination device the datagrams comprise consist a plurality of datagram segments, the datagrams are packaged in aggregated transport containers, and a datagram segment in the plurality of datagram segments represents segment information. In some embodiments the datagrams consist of the plurality of datagram segments. The method comprises: receiving feedback from the destination device if a transmission of a transport container has failed, reformatting the datagram by: disassembling the transport container the transmission of which has failed; and creating a plurality of new transport containers from less than all of the failed transport containers without splitting datagrams; and thereafter retransmitting the reformatted datagram to the destination device.

In an aspect, in a method for transmitting datagrams from a source device to a destination device, the datagrams comprise of a plurality of datagram segments, the datagrams are packaged in an aggregated packet structure comprising transport containers, and a datagram segment in the plurality of datagram segments represents segment information. The method comprises: detecting that a transport container cannot be transmitted, reformatting the datagram by: disassembling the transport container that cannot be transmitted; and creating a plurality of new transport containers from less than all of the transport containers that cannot be transmitted without splitting datagrams; and transmitting the plurality of further datagram segments.

In an aspect, a source device is configured to transmit datagrams comprising or consisting of a plurality of datagram segments to a destination device, and a datagram segment in the plurality of datagram segments is to represent segment information. The source device is configured to: receive feedback from the destination device that transmission of a datagram segment in a transmitted datagram has failed, decide whether a datagram segment that cannot be transmitted should be dropped, retransmitted as is without change, or reformatted and then retransmitted, and communicate the decision to the destination device.

In an embodiment, the source device is configured to reformat the datagram segment whose transmission has failed by assigning at least a new sequence number to the failed datagram segment.

In an embodiment, the source device is configured to retransmit datagrams comprising a plurality of datagram segments to a destination device, a datagram segment in the plurality of datagram segments to represent segment information, wherein the source device is configured to: detect that a datagram segment in a transmitted datagram cannot be transmitted, decide whether a datagram segment that cannot be transmitted will be dropped retransmitted, and communicate the decision to the destination device.

In an embodiment, the source device is configured to reformat the datagram segment that cannot be transmitted by assigning at least a new sequence number to the failed datagram segment.

In an embodiment, the source device comprises a transmitter flow controller configured to decide whether a datagram segment transmission will be dropped, the datagram segment retransmitted as is without change, or reformatted and then be retransmitted.

In an embodiment, the source device further comprises a transmitter flow controller configured to sequence transport containers containing the datagram segments.

In an embodiment, the source device further comprises a low level transmitter configured to transmit the transport containers to the destination device.

In an aspect, an aggregated packet structure held in a destination device comprises: a plurality of transport containers having a sequence number and each containing at least one piece of a datagram segment; at least two of the transport containers containing pieces of a datagram segment contained in the transport container that was transmitted by the source device but whose transmission has failed, the at least two of the transport containers having new sequence numbers, and at least one additional transport container which does not contain any piece of said datagram segment whose transmission has failed and which has a sequence number higher than the sequence numbers of the transport containers not including pieces of said failed datagram segment, wherein the sequence numbers of transport containers held in the destination device are ordered such that the sequence numbers of the at least two additional transport containers are in place of the sequence number of the transport container whose transmission has failed, and that the sequence number of the at least one additional transport container follows the highest sequence number of the transport container not containing any piece of the failed a datagram segment.

Herein, apparatuses, methods, and data restructures for reformatting and retransmitting the failed data payload in transmissions are disclosed. In one embodiment, there is an apparatus that is configured to receive feedback of transmission failure and reformatting indication, to decide what should be done with a payload whose transmission failed, and to choose to reformat and resequence the failed payload for retransmission in multiple transport containers. In one embodiment of the method, a transmitter transmits a data payload, receives notice of transmission failure, decided to reformat and resequence the payload, divides the payload into multiple transport containers, and retransmits the payload which has been placed into multiple transport containers using re-sequencing. In one embodiment, there is an aggregated data structure in which pieces of a failed payload transmission have been allocated between two or more transport containers for retransmission.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1:
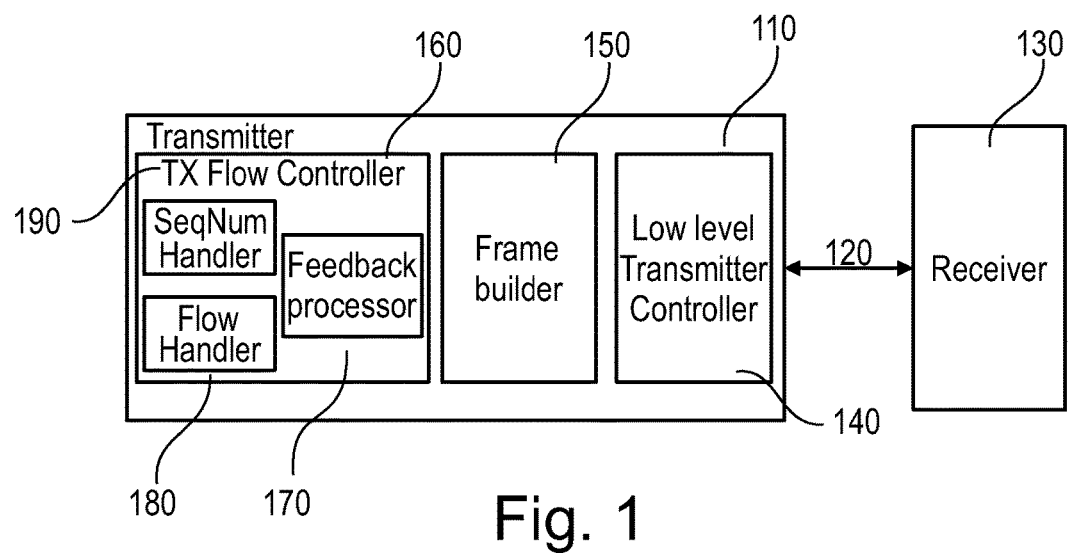
FIG. 1 illustrates one embodiment of a system for reframing and retransmission of datagram segments.

In this description, the following terms have the meanings indicated:

"Datagrams" are information elements in a communication system. The information in a "datagram" is called the "datagram payload".

A "source" is a place from which datagram segments are transferred out. One non-limiting example is a communication transmitter. In addition to transferring out datagram segments, a source may format transport containers, may receive feedback regarding the reception of transmitted datagram segments, may resequence and reformat datagram segments, and may perform such other processing functions to prepare and send retransmitted datagram segments as set forth in this description.

A "destination" is a place to which datagram segments are transferred in. One non-limiting example is a communication transmitter. One non-limiting example is a communication receiver. In addition to receiving transferred-in datagram segments, a destination may determine whether a datagram segment was improperly received, may send feedback to a source that a datagram segment was improperly received, may respond to requests to resequence and reformat datagram segments, may receive resequenced and reformatted datagram segments, may reorder received datagram segments, and may perform other such processing functions as set forth in this description.

The word "units" as used here includes both one or more sources, and one or more destinations.

"OSI" is short for "Open Systems Interconnection" model. The OSI includes seven layers, which are, from lowest to highest, the physical layer, the data link later, the network layer, the transport layer, the session layer, the presentation layer, and the application layer. The data link layer may have two sub-layers, which are the LLC and MAC sub-layers.

"Service data units" or "SDUs" are higher level communication datagram segments. These may be packed into transport containers called "PDUs".

"Protocol data units" or "PDUs" are containers used to transport SDUs from lower levels in an OSI system to higher levels. They may contain multiple SDUs and other information in addition to SDUs.

A "MAC sub-layer SDU" may be called a "MAC SDU" or simply an "MSDU".

A "MAC sub-layer PDU" may be called a "MAC PDU" or simply an "MPDU".

"Datagram segments" refers to the information transmitted by the system, also called the "payload", also called the "SDU" or "MSDU".

In technical literature of the prior art, the PDU is sometimes called a "datagram", but this may create confusion. Therefore, to avoid confusion between PDU and the term "datagram segment", the term "PDU" is not used herein as a "datagram segment", but means rather a "container" or "transport container" for one layer of the OSI model, and in particular an "MPDU" for a transport container at the MAC layer.

"SN" is a "sequence number", which is a unique sequence number that identifies containers being delivered from a higher to a lower layer in the OSI model. Sequence numbers are usually, but not necessarily, set by the chronological order in which the containers are sent.

A "transmission failure" is synonymous with a "container failure", and occurs when the container transmitted by a source has not been correctly received by a destination.

The "maximum transmission unit" or "MTU" of a container is the largest size of a container that may be transmitted, according to the definitions of the system. The MTU is often, but not necessarily, measured in numbers of bytes.

"Partitioning" is the process by which a datagram payload which is too large for the MTU limit is fragmented into two or more smaller pieces which are then encapsulated in two or more transport containers, none of which exceed the size of the MTU.

"Frame aggregation" is the process by which datagram payloads which have undergone partitioning are aggregated back together at the destination.

"PER" or "packet error rate" (or datagram error rate) is a measure of the transmission failure. This is typically, although not necessarily, measured as the number of transmission failures divided by the total number container transmissions.

"PPDU" is short for physical-layer PDU, and is a PDU at the physical-layer. The PPDU may have a significant amount of communication "overhead", which is the part of a container that is management and transport information rather than datagram payload.

"A-MSDU" is short for "aggregated MSDU", and may be called "MSDU aggregation". This is a type of frame aggregation defined in the IEEE technical standard known as 802.11 WLAN that occurs at the top of the MAC layer.

"A-MPDU" is short for "aggregated MPDU", and may be called "MPDU aggregation". This is a type of frame aggregation defined in the IEEE technical standard known as 802.11 WLAN that occurs at the bottom of the MAC layer.

There are various kinds of WLANs, but the 802.11 WLAN refers only to the specific WLAN defined by the IEEE as 802.11 WLAN. In the 802.11 WLAN, the "source" is called a "transmitter", and the "destination" is called a "receiver".

"Failure of transmission" is a case where a transport container containing a datagram segment was transmitted by a source but not received by a destination, or was transmitted by a source but received improperly by a destination such that the datagram segment cannot be properly processed by the destination.

An "aggregated packet structure" is a data structure with multiple transport containers, each such container containing at least one datagram segment.

FIG. 1 illustrates one embodiment of a system for reframing and retransmission of datagram segments. In FIG. 1, there is a Transmitter 110 on the left, connected by a two-way communication link 120 to a Receiver 130. The link 120 may be any kind of communicative connection between various transceivers, including either wireless or wire line or a combination of these. If it is wireless, in full or in part, it may operate at any frequency band, may be local area or wide area, and terrestrial or satellite. If it is wire line, to any degree, it may be any kind of wired connection, including, solely as examples, copper wiring, coaxial cable, or fiber optic. The unit on the left is called a "Transmitter" 110 in FIG. 1, and is so identified in this description, but it is a two-way unit (a transceiver). Similarly, the unit at the right is called a "Receiver" 130 in FIG. 1, and is so identified in this description, but it is a two-way unit (a transceiver). In systems other than 802.11 WLAN, these may be called a "source" and a "destination", respectively.

There are a number of functions that are implemented at the Receiver 130, as described in FIGS. 2-5 below. Similarly, there are a number of functions that are implemented at the Transmitter 110, as described in FIGS. 2-5 below. FIG. 1 shows that the functions at the Transmitter 110 may be executed in any of five physical structures, which are the Low Level Transmitter Controller 140, the Frame Builder 150, the Feedback Processor 170, the Flow Handler 180, and the SeqNum Handler 190. In FIG. 1, the last three structures have been combined into a super-structure which is called a Tx Flow Controller 160.

The specific structure depicted in FIG. 1 is exemplary only, and is not exclusive of alternatives. For example, the Tx Flow Controller 160 may consist of a single physical structure that executes all of the functions of the Feedback Processor 170, the Flow Handler 180, and the SeqNum Handler 190. For example, the Frame Builder 150 may be part of the Tx Flow Controller 160. In other embodiments, the Frame Builder 150 may be part of the Low Level Transmitter Controller 140. In some embodiments, the Frame Builder 150 may not appear at all, neither separately nor as part of another structure. In such embodiments, the functions described herein as being executed by the Frame Builder 150 will not be executed.

In some but not all embodiments, functions of the Receiver 130 could include all or a subset of the following:

Receiving transport containers from the Transmitter 120.

Acknowledging receipt of the transport containers, or indicating that a container transmission has failed.

Responding to requests for reframing of transport containers.

Responding to notifications that a transport container has been dropped.

Ordering datagram segments in a sequence as determined by the system, and sending the ordered datagram segments to a different level in the system (such level not shown in any of the Figures).

In some but not all embodiments, functions of the Transmitter could include all or a subset of the functions listed below. In addition, each function includes a physical structure that may execute the function, but in alternative embodiments, a function may be executed at and by different physical structures within the Transmitter:

Sequencing transport containers, which may be executed by the Sequence # Handler 190.

Transmitting transport containers to the Receiver, which may be executed by the Low Level Transmitter Controller 140.

Receiving notification of receipt or of failure from the Receiver, which may be executed by the Low Level Transmitter Controller 140.

Processing such notification, which may be executed by the Feedback Processor 170.

Deciding that a failed transport container will be retransmitted in an available window, or reframed, or dropped. The decision may be executed at the Flow Handler 180.

Reframing transport containers that are to be reframed, which may be executed by the Sequence # Handler 190.

Transmitting transport containers to the Receiver 130, which may be executed by the Low Level Transmitter Controller 140.

Receiving notification that reframed transport containers have been received or have failed, which may be executed by the Low Level Transmitter Controller 140.

In some embodiments, transport containers are aggregated into aggregated packet structures. In such embodiments, the aggregation may be executed by the Frame Builder 150. This could be true for original transmissions, or for transmissions of datagram which initially failed in transmission.

In some embodiments, there is communication between the Transmitter 110 and the Receiver 130 so that the Transmitter 110 may understand if the particular Receiver 130 can accept a reframing proposed by the Transmitter 110. This may occur in a situation in which the Transmitter 110 does not know capabilities of the particular Receiver 130, for example, where the Receiver 130 is not at a fixed location, or where the Receiver 130 has been introduced into the system for the first time, or where the Receiver 130 has been changed or upgraded in some way. In such embodiments, the Transmitter 110 may propose a change, which might be a reframing of transport containers, or a different aggregation of containers, or a fragmentation of one datagram segment into multiple pieces, or dropping a datagram segment. This change is proposed to the Receiver 130, which responds by stating that it can or it cannot accept the proposed change. Depending on the response from the Receiver 130, the Transmitter 110 will either execute the proposed change, or propose a different change, or simply drop the change altogether.

In alternative embodiments, this communication to establish Receiver 130 capability does not occur, either because the Receiver 130 has been pre-provisioned for this system, or the Receiver 130 automatically reports its capabilities as it enters the system, or the Transmitter 110 automatically requests a capabilities report when the Receiver 130 first enters the system, or for other reasons. These alternative embodiments may be possible for situations in which a generic solution is proposed by the Transmitter 110. In different scenarios, where the Transmitter 110 proposes a solution unique to the situation, these alternative embodiments may not be possible, and a communication handshake must be established for the Receiver 130 to tell the Transmitter 110 if the Receiver 130 can accept the proposed change.

There may be systems in which there's a variety of Receivers 130, and the Receivers 130 have differing abilities. That happens, for example, in the case of systems that have both legacy units and updated units operating at the same time. The communication handshake may be required in such systems, in some situations.

One embodiment is a source that has been configured to reformat and retransmit datagram segments whose transmission has failed. The source includes structural means for receiving feedback that a datagram segment transmission has failed, for deciding whether a datagram segment whose transmission will be dropped, retransmitted as is without change, or reformatted then retransmitted, for reformatting and resequencing transport containers containing datagram segments, and for transmitting the reformatted and resequenced transport containers. In one embodiment, the source is an electronic transmitter. In one embodiment, feedback of transmission failure is received and understood by a feedback processor. In one embodiment, the choice to drop, retransmit as is, or reformat and retransmit, a failed datagram segment, is made by a flow handler. In one embodiment, reformatting and resequencing pieces of the failed datagram segment is made by a sequence number handler. In one embodiment, transmission of reformatted and resequenced pieces of the failed datagram segment is done by a low level transmitter controller.

Figure 2:
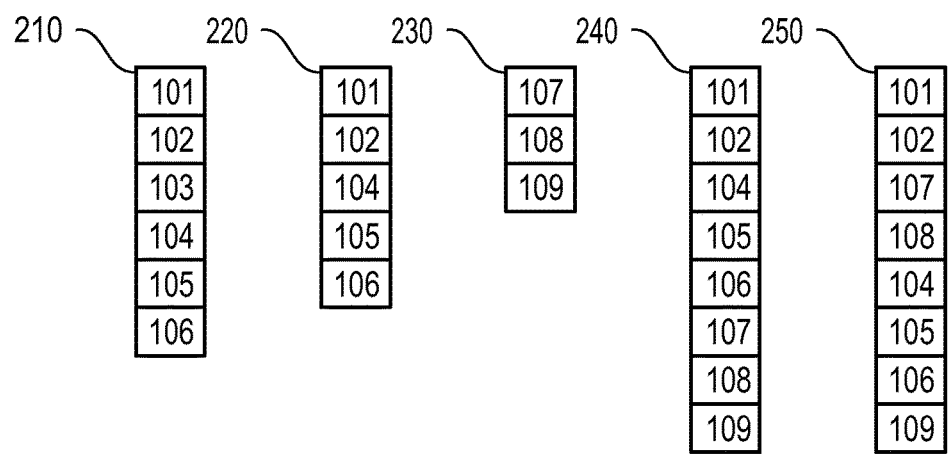
FIG. 2 illustrates one embodiment of a data structure for reframing and retransmission.

FIG. 2 is one embodiment of various data structures, showing a reordering of data structures according to one embodiment. In data structure 210, the Transmitter transmits various transport containers in a sequenced order, here represented by 101 to 106, respectively. In some cases, all of the transport containers will be received by the Receiver, but in other cases not. In data structure 220, the Receiver has received transport containers 101, 102, 104, 105, and 106, but the transmission of 103 has failed, meaning either that container 103 was not received at all or was received in a damaged form that cannot be repaired at the Receiver. In such a situation, the system may decide to reframe and then transmit the reframed transport container. For example, in data structure 230, the Transmitter will transmit transport containers 107, 108, and 109, in which the datagram segment in original container 103 has been fragmented into two new transport containers 107 and 108, followed by new transport container 109. The Transmitter then transmits the reframed and re-sequenced protocol containers, as shown in the data structure 240, where the reframing is represented by 107 and 108 (instead of former number 103) and the re-sequencing is represented by transport containers 107-109 at the end of the transmission from the Transmitter to the Receiver. In other words, data structure 240 illustrates both the way the Transmitter transmits the reframed and re-sequenced transport containers, and the way in which such transport containers are received by the Receiver. However, there is a problem in that the order in which the transport containers is received is not the way that the datagram segments in the containers are intended to be sequenced. Therefore, in data structure 250, the Receiver has reordered the transport containers so that the encapsulated datagram elements will appear in their appropriate sequence. These reordered datagram elements may be passed on by the Receiver to different layers in the system. Data structure 250 shows the results of one embodiment, in which a failed container 103 has been divided into two containers 107 and 108, retransmitted, and then reordered by the Receiver in the correct sequence.

One embodiment is an aggregated packet structure, in which multiple transport containers are held in a source, and each such transport container contains at least one piece of a datagram segment that was transmitted by the source but whose transmission failed. Also, each such transport container with a piece of the failed datagram segment has a sequence number. Also, there is at least one additional transport container that does not contain any part of the failed datagram segment and which has a sequence number higher than the sequence numbers of the transport containers including pieces of the failed datagram segment.

Figure 3:
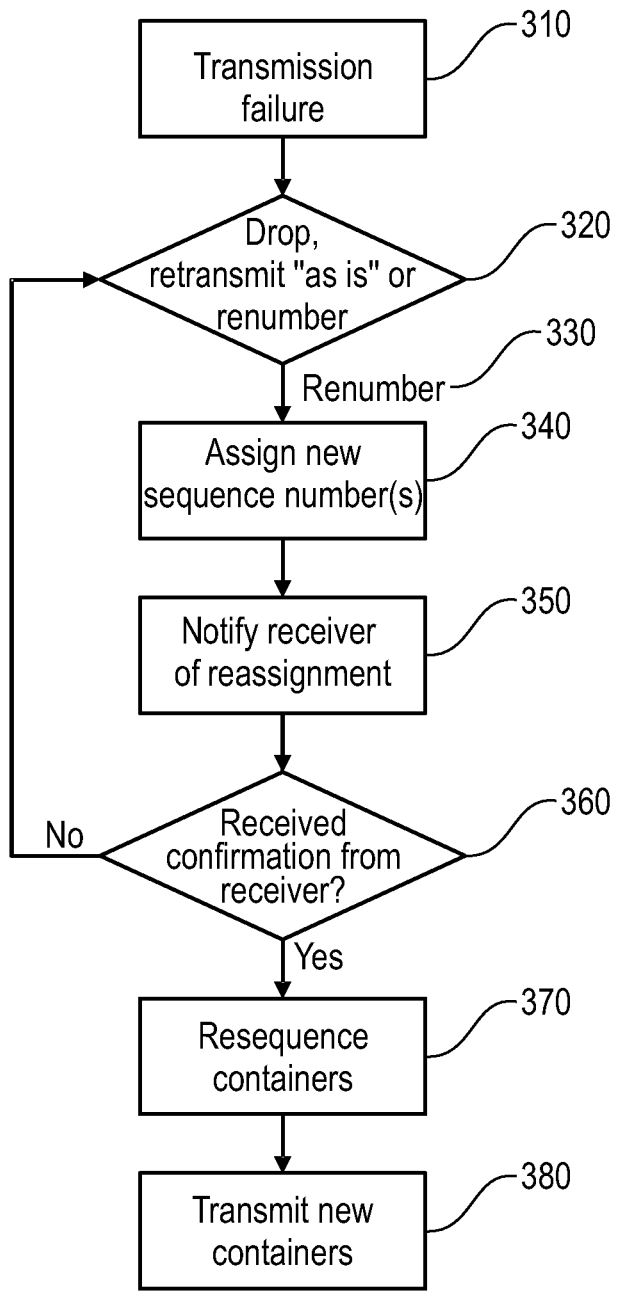
FIG. 3 illustrates one embodiment of a method for reframing and retransmitting datagram segments.

FIG. 3 is one embodiment of a method for reframing and retransmitting datagram segments. In step 310, the transmission of a transport container to the Receiver has failed. The Receiver will report this failure to the Transmitter. The Transmitter will then decide, in step 320, what to do with the failed container. There are four possibilities.

Figure 5:
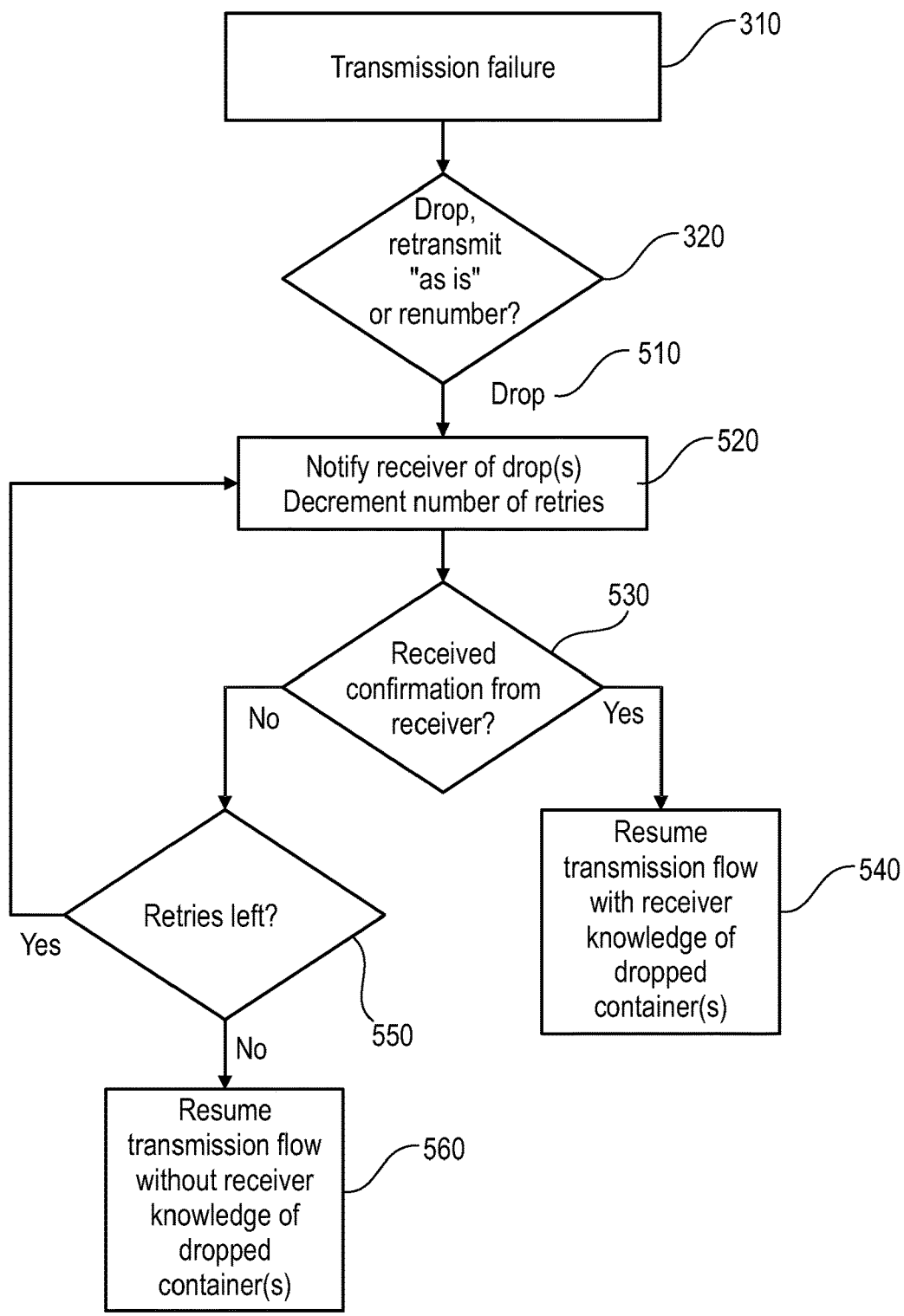
FIG. 5 illustrates one embodiment of a method for dropping datagram segments from a transmission.

One possibility is that the failed container is simply dropped, without any repackaging or retransmission. The system may make this decision based on environmental conditions for transmission existing at the time, and the datagram segment in the failed container. Dropping a datagram segment is not further illustrated in FIG. 3, but is illustrated in FIG. 5.

A second possibility is to retransmit the failed container "as is", with no changes. According to this possibility, the Transmitter simply waits until there is an available window for transmission, and then retransmits the failed container with its encapsulated datagram element. This possibility is part of the prior art, and is not illustrated in FIG. 3, although the point of decision is illustrated in element 320.

A third possibility is that the failed container will be renumbered and retransmitted as a single container, in which case the method will continue as illustrated in FIG. 3, steps 330-380 inclusive. In step 330, the Transmitter decides to renumber the failed container. The Transmitter assigns a new sequence number 340 to the renumbered container. The Transmitter then notifies the Receiver 350 of the new sequence number. The Receiver must then decide if it can accept the resequenced container in the manner proposed by the Transmitter. If the answer is yes, then the Receiver sends confirmation, and the Transmitter receives confirmation 360 that the answer is yes. The Transmitter will then resequence the container 370 and transmit the new container 380. If the answer is no, then a decision must be made at step 320 what to do with the failed container.

A fourth possibility is a variation of the third possibility in which the datagram segment in the failed container is divided among two or more containers. In this variation, the Transmitter decides 330 to renumber the datagram segment as part of multiple containers. The Transmitter assigns new sequence numbers to the multiple containers 340. The Transmitter will notify the Receiver of the new sequence numbers 350, and propose that the failed datagram segment be retransmitted as part of the multiple containers. The Receiver must decide if it can accept this proposed solution. If it can, it will send confirmation. The Transmitter receives the confirmation 370, resequences the containers 370, and transmits the new containers with the datagram segment divided between two or more transport containers 380.

Figure 4:
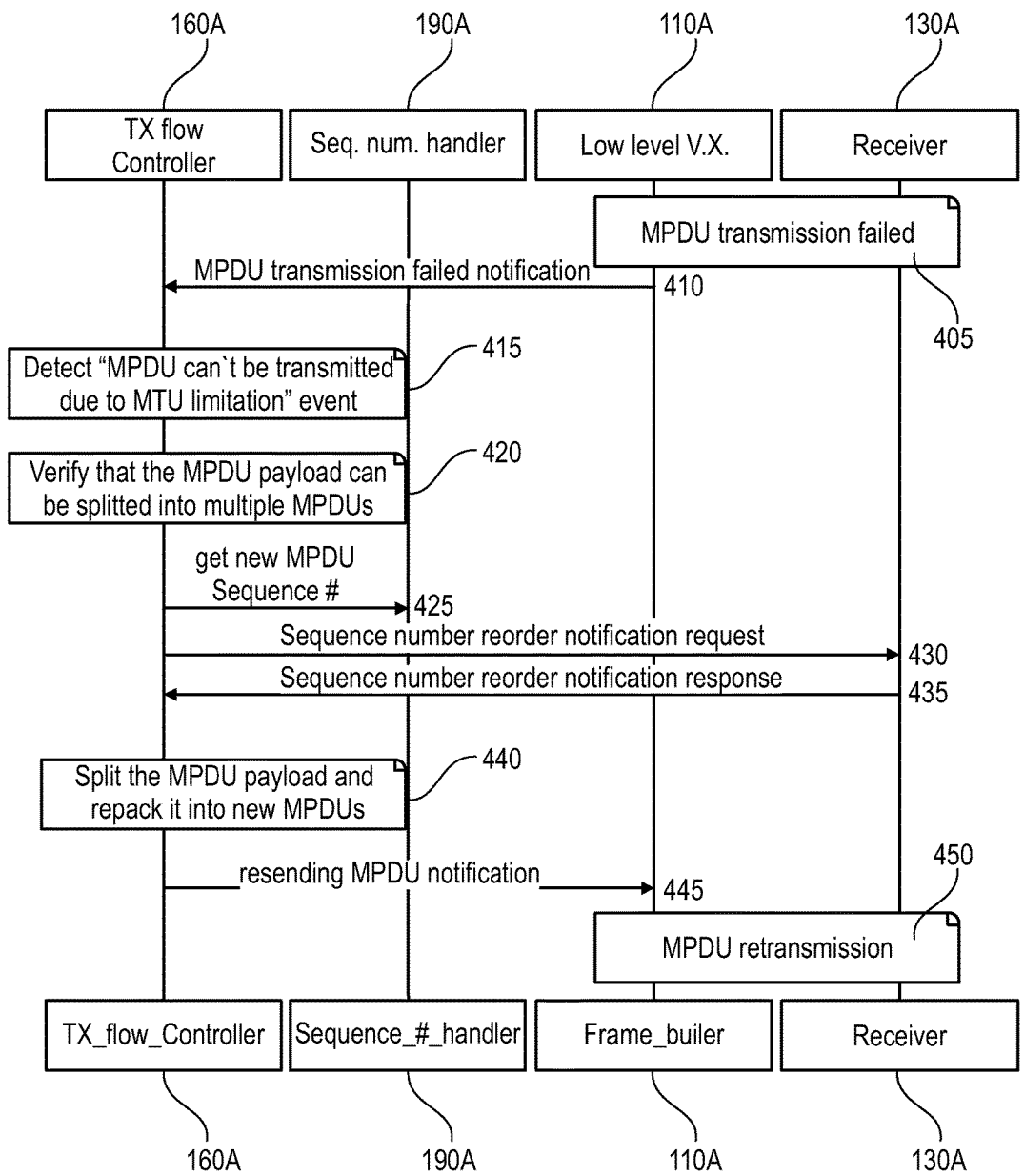
FIG. 4 illustrates one embodiment of a method for reframing and retransmitting datagram segments in which a datagram segment is divided between two or more transport containers.

FIG. 4 is an alternative embodiment of a method for reframing and retransmitting containers and their encapsulated datagram segments. FIG. 4 is one example of the kind of method illustrated in FIG. 3. FIG. 4 relates specifically to the 802.11 WLAN environment, which is one environment for some of the embodiments. FIG. 4 shows also exemplary implementations, with specific physical units executing specific functions, although these same functions could be executed by different physical units within the system.

In FIG. 4, there is a TX flow controller 160A, which is similar to element 160 in FIG. 1, except that element 160A is configured to include only the Feedback processor 170 and Flow Handler 180, neither of which are shown in FIG. 4. FIG. 4 does not show SegNum Handler 190, because that element is part of the structure of 160. In FIG. 4, SegNum Handler 190A is structured separately from the TX flow Controller 160A, which is one alternative embodiment of a structure for implementation of various method embodiments. The functions performed by TX flow Controller 160A are those performed by Feedback processor 170 and Flow Handler 180, but in FIG. 4 these are illustrated specifically in an 802.11 WLAN environment. The functions performed by SegNum Handler 190A are those performed by SegNum Handler 190, but in FIG. 4 these are illustrated specifically in an 802.11 WLAN environment. The functions performed by Low Level Transmitter 110A are those performed by Low Lever Transmitter 110, and the functions performed by the Receiver 130A are those performed by 130, but in FIG. 4 all of these functions are illustrated specifically in an 802.11 WLAN environment.

FIG. 4 is constructed such that there is a chronological order of steps beginning with 405 at the top and progressing through 450 at the bottom. It will be understood that every communication to or from Receiver 130A is with a low level transmitter controller that is part of a Transmitter, but for purposes of simplicity of presentation such a controller is not shown in FIG. 4. This applies to steps 405, 430, 435, and 450.

In FIG. 4, a Transmitter has transmitted an MPDU, but this Transmission has failed 405. Within the Transmitter, this failure is communicated 410 from Low Level Transmitter 110A to TX flow Controller 160A. The TX flow controller 160A detects that the failed MPDU cannot be transmitted due to an MTU limitation event 415, and then verifies that the MPDU payload can be split into two or more MPDUs 420. The TX flow controller 160A will then request 425 and receive from the SegNum Handler 190A new sequence numbers for the MPDUs which will contain the payload. The TX flow controller will then send 430 to the Receiver 130A a sequence number reorder notification request. The Receiver 130A will send, and the TX flow controller 160A will receive 435 a response, stating whether the Receiver 130A it will be able to receive these multiple resequenced MPDUs. If the response is positive, then the TX flow Controller 160A will split the payload and repack it into two or more new MPDUs 440. The TX flow Controller will then notify 445 a Frame builder 150 (not shown in FIG. 4) of the new resequencing, which will aggregate the new MPDUs with the additional MPDUs that are part of the transmission, and the reaggregated MPDUs including the new MPDUs will be retransmitted 450 by Low Level Transmitter 110A to the Receiver 130a. If at step 435, the Receiver 130A has informed the TX flow Controller 160A that the Receiver 160A cannot receive the multiple resequenced MPDUs, then the method will return to step 415, where the TX flow Controller 160A will determine the event. If the TX flow Controller 160A determines at 420 that the payload cannot be split into multiple MPDUs, then the failed MPDU payload will either be dropped, retransmitted as is, or retransmitted as a single new container, all as shown at step 320 in FIG. 3, but not shown in FIG. 4.

It will be understood that although FIG. 4 shows different physical units executing particular steps, these steps could have been executed by different physical units. Further, the exact sequence shown could be altered in many ways for different embodiments, and in such alternative embodiments, a variety of physical units may execute the various functions.

In one possible embodiment of FIG. 4, there is a new sequence control and synchronization mechanism between the Transmitter and Receiver which enables the transmission of a datagram (MPDU) containing multiple high level protocol datagram segments (MSDU) by splitting the MSDU into multiple MPDUs using the existing sequence generation mechanism (that is, without a need for MSDU sequence number or traditional fragmentation mechanism). This particular embodiment is a method that identifies events when an MPDU cannot be transmitted due to MTU limitation. In this embodiment, there is a mechanism to notify that MSDUs previously encapsulated in a MPDU with a specific sequence number have now been encapsulated into multiple MPDUs with specific sequence numbers for retransmission, so the reordering function at the Receiver should consider the sequence number modifications when reordering the received MSDUs and delivering them to the higher layers.

FIG. 5 is one embodiment of a method for dropping containers and their encapsulated datagram segments from a transmission. FIG. 5 begins in the same way as FIG. 3. In step, the transmission of a container from a Transmitter to a Receiver has failed 310. The Receiver will report this failure to the Transmitter. The Transmitter will then decide, in step 320, to drop the container, or retransmit it as is with no change (except that it will be retransmitted in an upcoming available window), or to "renumber" the failed container. In this sense, "renumber" may mean to give a new sequence number to the failed container, or to fragment the encapsulated datagram element into multiple containers and to give a sequence number to each such container, or both. In FIG. 5, the Transmitter decides to drop the container 510. The Transmitter notifies the Receiver of the drop 520. If the Receiver receives notification, it will send confirmation to the Transmitter (not shown in FIG. 5). The Transmitter may or may not receive this confirmation from the Receiver 530. If confirmation is received, the Transmitter continues with transmission of containers and their encapsulated datagram segments 540. If the Transmitter does not receive confirmation from the Receiver, the Transmitter will determine if the maximum number of retries has been reached for notification of this dropped container 550. If retries are left, the process will repeat from step 520. If no retries are left, the Transmitter will resume transmission of containers 560, even if the Receiver does not know of the dropped container.

In some embodiments, there may be a pre-determined number of notification attempts by the Transmitter to the Receiver before the Transmitter continues transmitting containers, even though the Receiver may be ignorant of the drop. If that is the case, then as shown in 520, every time a notification attempt is made, the number of retries available will be decreased by one. The number of retries permitted may be the same for all dropped containers, or may vary by type or size of the container, or by nature of the encapsulated datagram segment, or by time of day, or by any other reason as determined by the system. Once the total number of permitted retries has been reached, then there are no retries left, and thus after 530 the transmitter will resume transmission flow whether the Receiver knows of the dropped container 540 or does not know 560.

One embodiment is a method for processing a datagram segment whose transmission has failed. In one alternative embodiment, a transmitter transmits a transport container containing a datagram segment, receives notice that the transmission has failed, and decides whether to drop the datagram segment, retransmit it as is without change, or reformat and resequence it for retransmission. Also, if the transmitter decides to reformat and resequence, the transmitter will split the failed datagram segment into multiple pieces, repack each piece into its own transport container, and retransmit the pieces of the failed datagram segment but this time as part of multiple transport containers into which the pieces have been repacked.

Some embodiments are a new sequence control and synchronization mechanism between the transmitter and receiver which enable the transmission of transport containers containing multiple old and reformatted new datagram segments. In some embodiments, a datagram segment is split among two or more new transport containers using a pre-existing sequence generation mechanism. In this sense, "pre-existing sequence generation mechanism" means that once MPDU transmission failure has been detected, MPDU payloads are automatically split into multiple MPDUs, without a need for sequence renumber notification request 430 or sequence number reorder notification response 435.

Some embodiments include identifying events when a transport container cannot be successfully transmitted, due to MTU (temporary or permanent) limitations or other reasons. In such embodiments, a transmitter notifies a receiver that datagram segments previously encapsulated in a transport container with a specific sequence number will now be re-encapsulated in multiple transport containers having new sequence numbers for retransmission. The receiver receives these new multiple transport containers, and reorders as they were transmitted in the original SN using the transformation between the old and the new sequence numbers, thereby preparing the encapsulated datagram segments for delivery to other protocol layers in the system.

Some embodiments include identifying events when a transport container cannot be successfully retransmitted, due to MTU (temporary or permanent) limitations or other reasons. In such embodiments, a transmitter notifies a receiver that datagram segments previously encapsulated in a transport container with a specific sequence number will be discarded by the transmitter. The receiver receives this notification and delivers the other, correctly received MSDUs to the other protocol layers in the system without waiting for the discarded MSDUs.

Some embodiments include a communication capability negotiation between a transmitter and a receiver in which the receiver notifies the transmitter whether or not the receiver can support a proposed re-encapsulation and re-sequencing of datagram segments. Such negotiation may be "static" in the sense that the parameters are very tightly defined, or "dynamic" in the sense that questions may be adapted and answered according to various circumstances. If the receiver has such capability to support re-encapsulated and re-sequenced datagram segments, the transmitter will execute the re-encapsulation and re-sequencing. If the receiver does not have such capability, then the datagram segments would not be re-encapsulated, but rather they would be retransmitted as are or they would be dropped. In some embodiments, the transmitter can provide the appropriate action, either with or without re-encapsulation and re-sequencing, both to receivers having the capability and to those not having the capability. It is anticipated that legacy receivers in particular may not have the capability. Also they can negotiate the re-sequencing method to be used.

Implementations and points of novelty related to notification by a transmitter to a receiver that a transport container will be dropped can apply to all communication systems in which data is transferred from a transmitter to a receiver, and in which the receive provides acknowledgement of successful or failed transmission. This includes systems that operate according to both formal standards (such as, but not exclusively, standards promulgated by the IEEE) and to de facto standards (whether formally promulgated by any body or not).

Implementations and points of novelty related to re-sequencing of failed transmissions can apply to any communication system that involves sequencing of packets, whether or not the system operates according to a technical standard defined by the IEEE, a technical standard defined by another body, or a de facto standard not defined by any body. An example of a technical standard not defined by the IEEE is the TCP standard, which uses sequencing of packets.

Some embodiments apply to communication systems operating in accordance with a technical standard promulgated by the IEEE. In such embodiments, there is a new sequence control and synchronization mechanism between the transmitter and receiver which enables the retransmission of new transport containers (MPDUs) containing multiple high level protocol datagram segments (MSDUs). This may be achieved by splitting an MSDU or A-MSDU into multiple MPDUs using the existing sequence generation mechanism (without a need to assign sequencing numbers to MSDU segments). In such embodiments, events are identified when an MPDU cannot be transmitted due to MTU limitations or for other reasons. There is then a mechanism for a transmitter to notify a receiver that MSDUs or A-MSDUs previously encapsulated in a single MPDU with a specific sequence number will now be encapsulated into multiple MPDUs with new specific sequence numbers for retransmission. The receiver can then reorder the MSDUs in accordance with full information about sequence numbers (including both the original sequence numbers and the new SNs for the failed transmission), in order to prepare the MSDUs for retransmission to other protocol layers in the system.

Also in embodiments applying to communication systems operating in accordance with a technical standard promulgated by the IEEE, there is a communication handshake between a transmitter and a receiver in which the receiver notifies the transmitter whether or not the receiver can support a proposed re-encapsulation and re-sequencing of datagram segments. If the receiver has such capability, the transmitter will execute the re-encapsulation and re-sequencing. If not, then the datagram segments would not be re-encapsulated, but rather they would be retransmitted as are or they would be dropped. In some embodiments, the transmitter can provide the appropriate action, either with or without re-encapsulation and re-sequencing, both to receivers having the capability and to those not having the capability. It is anticipated that legacy receivers in particular may not have the capability The standard 802.11 WLAN is a technical standard promulgated by IEEE. Therefore, the embodiments summarized above, applying to systems operating in accordance with IEEE standards, apply also to 802.11 WLAN systems. In addition, in some embodiments in an 802.11 WLAN system, the receiver notifies the transmitter of a failed MPDU transmission, after which the transmitter will use a specific set of previously unused SNs to re-sequence the failed MPDU (or to split the failed transmission into multiple MPDUs and then to re-sequence the multiple MPDUs). The transmitter will transmit, with the new sequence numbers, and the receiver will use these sequence numbers to reorder the MSDUs, and thus to prepare the MSDUs for retransmission to other protocol layers in the system. In another embodiment in an 802.11 WLAN system, the receiver notifies the transmitter of a failed MPDU transmission, after which the transmitter will discard the failed MPDU and notify the receiver of the discard, and the receiver will use this information to deliver MSDUs encapsulated in subsequently received MPDUs to other protocol layers.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

The invention claimed is:

1. A source device for sending datagrams contained in an aggregated packet structure comprising transport containers each containing a segment of a respective datagram, the source device comprising:
    a transmitter, the transmitter comprising:
        a detector circuit configured to obtain information if a transmission of a transport container by the transmitter has failed;
        a disassembler circuit configured to disassemble the transport container in which transmission has failed; and
        a container creator circuit configured to create a plurality of new transport containers, the new transport containers to include at least one of fragments or portions of the datagram segment contained in the transport container in which transmission has failed,
    wherein the transmitter is configured to send sequence information indicating a conversion between a sequence of the transport containers of the aggregated packet structure comprising the transport container in which transmission has failed and a sequence of the transport containers of the aggregated packet structure comprising the new transport containers,
    wherein the source device is configured to reformat and retransmit datagrams in which transmission has failed, wherein the reformatting is performed without splitting datagrams, and
    wherein the source device is further configured to:
        notify a destination device that the reformatted datagram segments have been reformatted and are ready to be transmitted using the transmitter,
        receive notification from the destination device that the destination device can accept the reformatted datagram segments, and
        thereafter transmit the reformatted datagram segments to the destination device using the transmitter.

2. The source device of claim 1, wherein the detector circuit comprises a feedback processor configured to receive feedback if a transmission of a transport container has failed.

3. The source device of claim 1, wherein the detector circuit is configured to detect if a transport container cannot be transmitted.

4. The source device of claim 1, wherein the source device is configured to assign representation of segment information represented by the datagram segment in a transport container in which transmission has failed to a plurality of further datagram segments in a plurality of new transport containers to collectively represent the segment information.

5. The source device of claim 4, wherein assigning representation of segment information includes reformatting the datagram segment by disassembling the datagram segment to assign the datagram segment to multiple new segments, and by placing the new segments into multiple new transport containers for later transmission.

6. The source device of claim 1, wherein assigning representation of segment information includes reformatting the transport container that cannot be transmitted by disassembling the datagram segment to split the datagram segment into multiple new datagram segments, and by placing such new datagram segments into multiple new transport containers for later transmission.

7. The source device of claim 1, the source device using an aggregated packet structure, the aggregated packet structure comprising:
   a plurality of transport containers, each containing at least one piece of a datagram segment;
   wherein each transport container containing at least one piece of said datagram segment has a sequence number;
   when the packet structure is held in the source device, further comprising at least one transport container in which transmission from the source device to a destination device has failed;
   at least two of the transport containers containing pieces of the datagram segment contained in the transport container in which transmission has failed, and having new sequence numbers; and
   at least one additional transport container which does not contain any piece of said datagram segment in the transport container in which transmission has failed and which has a sequence number higher than the sequence numbers of the transport containers including pieces of said datagram segment in the transport container in which transmission has failed.

8. The source device of claim 7,
   wherein the sequence numbers of transport containers, when the aggregated package structure is held in a destination device, are ordered such that the sequence numbers of the at least two transport containers containing pieces of the datagram segment contained in the transport container in which transmission has failed are in place of the sequence number of the transport container in which transmission has failed, and that the sequence number of the at least one additional transport container follows the highest sequence number of the transport containers not containing any piece of the datagram segment contained in the transport container in which transmission has failed.

9. A method for transmitting datagrams from a source device to a destination device, the datagrams comprising a plurality of datagram segments that are packaged in an aggregated packet structure comprising transport containers, wherein a datagram segment in the plurality of datagram segments represents segment information, the method comprising:
   detecting, at a transmitter circuit, that a transport container cannot be transmitted,
   upon detecting that the transport container cannot be transmitted, reformatting the datagram at the transmitter circuit by:
   disassembling the transport container that cannot be transmitted; and
   creating a plurality of new transport containers comprising reformatted datagram segments;
   notifying a destination device that the new transport containers comprising reformatted datagram segments have been reformatted and are ready to be transmitted using the transmitter,
   receiving notification from the destination device that the destination device can accept the new transport containers comprising reformatted datagram segments, and
   thereafter transmitting the new transport containers comprising reformatted datagram segments to the destination device using the transmitter.

10. The method of claim 9, wherein the detecting that a transport container cannot be transmitted includes receiving feedback at the transmitter circuit from a destination device if a transmission of a transport container has failed.

* * * * *